United States Patent [19]

Lin et al.

[11] Patent Number: 5,713,017

[45] Date of Patent: Jan. 27, 1998

[54] DUAL COUNTER CONSISTENCY CONTROL FOR FAULT TOLERANT NETWORK FILE SERVERS

[75] Inventors: Dah-Haur David Lin; Shaw-Ben Shi; Yi-Hsiu Wei, all of Austin, Tex.

[73] Assignee: International Business Machines Corporation, Armonk, N.Y.

[21] Appl. No.: 484,228

[22] Filed: Jun. 7, 1995

[51] Int. Cl.$^6$ .................................................. G06F 17/30
[52] U.S. Cl. ...................... 395/608; 395/610; 395/609
[58] Field of Search .................... 395/182.04, 575, 395/200.03, 200.02, 650, 608, 610, 606, 607, 609; 455/601; 370/16.1; 364/200

[56] References Cited

U.S. PATENT DOCUMENTS

| | | | |
|---|---|---|---|
| 4,112,488 | 9/1978 | Smith, III | 364/200 |
| 4,318,182 | 3/1982 | Backman et al. | 369/200 |
| 4,569,015 | 2/1986 | Dolev et al. | 364/200 |
| 4,630,045 | 12/1986 | Georgiou | 340/825.79 |
| 4,713,755 | 12/1987 | Worley, Jr. et al. | 364/200 |
| 4,823,310 | 4/1989 | Grand | 364/900 |
| 4,945,474 | 7/1990 | Elliott et al. | 364/200 |
| 5,023,942 | 6/1991 | Goepel | 455/601 |
| 5,084,816 | 1/1992 | Boese et al. | 395/575 |
| 5,123,104 | 6/1992 | Levine et al. | 395/608 |
| 5,191,652 | 3/1993 | Dias et al. | 395/200 |
| 5,210,871 | 5/1993 | Lala et al. | 395/650 |
| 5,226,129 | 7/1993 | Ooi et al. | 395/375 |
| 5,247,672 | 9/1993 | Mohan | 395/650 |
| 5,307,487 | 4/1994 | Tavares et al. | 395/650 |
| 5,307,490 | 4/1994 | Davidson et al. | 395/650 |
| 5,325,517 | 6/1994 | Baker et al. | 395/575 |
| 5,339,408 | 8/1994 | Bruckert et al. | 395/575 |
| 5,371,885 | 12/1994 | Letwin | 395/601 |
| 5,448,723 | 9/1995 | Rowett | 395/200.02 |
| 5,459,862 | 10/1995 | Garliepp et al. | 395/600 |
| 5,495,609 | 2/1996 | Scott | 395/608 |
| 5,497,463 | 3/1996 | Stein et al. | 395/200.03 |
| 5,499,367 | 3/1996 | Bamford et al. | 395/600 |
| 5,513,314 | 4/1996 | Kandasamy et al. | 395/182.04 |
| 5,544,151 | 8/1996 | Baek et al. | 370/16.1 |
| 5,557,792 | 9/1996 | Josten et al. | 395/600 |
| 5,561,797 | 10/1996 | Gilles et al. | 395/600 |
| 5,630,124 | 5/1997 | Coyle, Jr. et al. | 395/614 |

OTHER PUBLICATIONS

Jessie Liberty "Teach Yourself C++ in 21 Days" (pp. 274–282) 1994.

IBM Technical Bulletin vol. 37 No. 11, Nov. 1994, User Interface For A Parallel File System, pp. 477–480.

IBM Technical Bulletin vol. 36, No. 11, Nov. 1993, Avoid Buffer Pool Scan at Dataset Close, pp. 361–362.

IBM Technical Bulletin vol. 36, No. 10, Oct. 1993, Scheme for Controlling Concurrent Algorithms that Update Linked Data Structures, pp. 437–440.

IBM Technical Bulletin vol. 34 No. 6, Nov. 1991, Timestamp Ordering Divergence Control For Epsilon–Serializability, pp. 215–218.

IBM Technical Bulletin vol. 34 No. 4B, Sep. 1991, Method To Enhance Concurrency Control of Access To A Remote Server Via NetBios In A Microsoft Windows Environment, pp. 150–151.

IBM Technical Bulletin vol. 24 No. 2, Jul. 1981, Multiprocessor System For Executing Concurrent Sequential Processes With Shared Variables, pp. 1019–1020.

*Primary Examiner*—Thomas G. Black
*Assistant Examiner*—Frantz Coby
*Attorney, Agent, or Firm*—Jeffrey S. LaBaw

[57] ABSTRACT

A consistency control method for a fault tolerant file system. Data files in this fault tolerant file system are replicated on file system servers. The update request will be sent to all the file servers. However, since different servers might receive update requests in different order. The "dual-counter" scheme described in this invention is to resolve this problem. To perform an update, the client needs to obtain a sequence number from a sequencer. Two counters will be maintained by each server. The first counter is used primarily by the sequencer to sent out sequence numbers. The second counter is used by the server to keep track of the largest sequence number of requests which have been completed on the server. With the sequence numbers and the first and second counters, updates will be performed in the same order on different file servers.

18 Claims, 3 Drawing Sheets

DUAL COUNTER CONSISTENCY CONTROL FOR FAULT TOLERANT NETWORK FILE SERVERS

DESCRIPTION

BACKGROUND OF THE INVENTION

This invention relates generally to distributed computing environments. More particularly, it relates to consistency control for a fault tolerant replicated file system.

A basic technique for improving reliability of a file system is to mask the effects of failures through replication. There are two major approaches of building a fault tolerant file system: hardware replication approaches and software replication approaches. HA-NFS is representative of the hardware replication approach. HA-NFS uses dual-ported disks which are accessible to a server and a backup. Each HA-NFS server is assigned a backup that can access the server's disk if the server fails. The server stores information about its volatile state on a disk log. If the server fails, the backup will reconstruct the server's lost state using the log. For further details on HA-NFS, the user is referred to "A Highly Available Network File Server", A. Birdie et el. in USENIX Conference Proceedings, pp. 199–205, Jan. 1991.

However, in a distributed environment, it is not always necessary to use special hardware for improved reliability. The computers connected by the network are a natural resource of duplicates. The software replication approach replicates file systems on workstations in the network. If the primary file system crashes, one of the available file systems will take over and provide the data access services. Consistency control protocols are implemented to ensure the consistency among file system replicas. Several existing file systems can be categorized as software approaches. The advantages of a software replication approach are:

1. Flexibility. A replicated file system can reside on any workstation in the network.
2. Fault tolerance. Tolerate both hardware and software failures. Since each workstation has its own hardware devices and operating system, the failure of one workstation does not affect the operation of others.
3. Performance. Better performance can be achieved through distributing file read operations among file system replicas.

Two known software replication approaches include RFNS and Deceit. RNFS achieves fault-tolerance by replicating the server and by using an automatic broadcast protocol for communication. The client sends its requests to an intermediary (an agent) that in turn broadcasts to all of the servers. To the client, the agent appears to be a file server that has an exceptionally reliable secondary storage. The advantage of this approach is that the clients can stay unchanged. However, all RNFS requests have to pass through the agent. For each RPC to the server, an additional RPC is required for this extra level of indirection. Another problem with the agent is that it is a critical process. If the agent fails, all files are not accessible. RNFS introduces a mechanism to replicate the agents and control the data consistency among the agents. The reader is referred to K. Marzullo and F. Schmuck "Supplying high availability with a standard network file system", IEEE Eighth International Conference on Distributed Computing, June 1988, pages 447–453 for more details on RNFS.

Similar to RNFS, Deceit uses an intermediary, the Deceit server to catch the requests from the clients and forward them to a group of replicated servers. Deceit provides a wide range of protocol "control knobs" to allow trade-offs among performance, availability, concurrency and consistency. Thus, users that do not require certain properties on some files are not forced to pay the corresponding overhead. Deceit is built on the ISIS Distributed Programming Environment, which provides reliable process groups, communication primitives and failure detection. More details on Deceit can be found in A. Siegel, K. Birman and K. Marzullo. "Deceit: A flexible distributed file systems" In Summer 1990 USENIX Conference, pages 51–61, Anaheim, Calif., June 1990. ISIS is described in greater detail in K. Birman and R. Cooper "The ISIS project: real experience with a fault tolerant programming system", Oper. Sys. Rev. vol. 25 No. 2 Apr. 1991 pages 103–107.

The invention of the fault tolerant network file system discussed below is an example of the software replication approaches.

SUMMARY OF THE INVENTION

Therefore, it is an object of the invention to synchronize multiple updates to a replicated file.

It is another object of the invention that failures and recovery be transparent to the users of the file system.

It is another object of the invention to allow updates to replicate file servers even though one of the file servers has failed.

It is another object of the invention to support heterogenous hardware platforms.

It is another object of the invention to minimize the performance impact of adding fault tolerance to a distributed file system.

It is another object of the invention to support heterogeneous file systems.

These and other objects are accomplished by a consistency control method for a fault tolerant file system. Data files in this fault tolerant file system are replicated on a group of file system servers. The update request will be sent to all the file servers. However, since different servers might receive update requests in a different order, each server is equipped with the "dual-counter" mechanism described in this invention. To perform an update, the client needs to obtain a sequence number from a sequencer, typically a designated server of the group of file servers. Two counters will be maintained by each server. The first counter is used primarily by the sequencer to send out sequence numbers. The second counter is used by each server to keep track of the largest sequence number of requests which have been completed on the server. With the sequence numbers and the first and second counters, updates will be performed in the same order on different file servers.

BRIEF DESCRIPTION OF THE DRAWINGS

These objects, features and advantages will be more readily understood with reference to the attached figures and following description.

DETAILED DESCRIPTION OF THE PREFERRED EMBODIMENT

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal Systems/2 Model 50, 60 Systems* IBM Corporation, Part No. 68X2224 Order Number S68X-2224 and *Technical Reference 2 Manual Personal Systems/2 (Model 80) IBM Corporation* Part No. 68X 2256 Order Number S68X-2254. One operating system which an IBM PS/2 personal computer may run is IBM's OS/2 2.0 (TM) for more information on the IBM OS/2 2.0 Operating System the reader is referred to *OS/2 2.0 Technical Library, Programming Guide Vol. 1, 2, 3 Version 2.00* Order Nos. 10G6261, 10G6495, 10G6494.

In the alternative, the computer system might be in the IBM RISC System/6000 (TM) line of computers which run on the AIX (TM) operating system. The various models of the RISC System/6000 is described in many publications of the IBM Corporation for example, *RISC System/6000, 7073 and 7016 POWERstation and POWERserver Hardware Technical* reference, Order No. SA23-2644-00. The AIX operating system is described in *General Concepts and Procedure—AIX Version 3 for RISC System/6000* Order No. SC23-2202-00 as well as other publications of the IBM Corporation.

Figure 1:
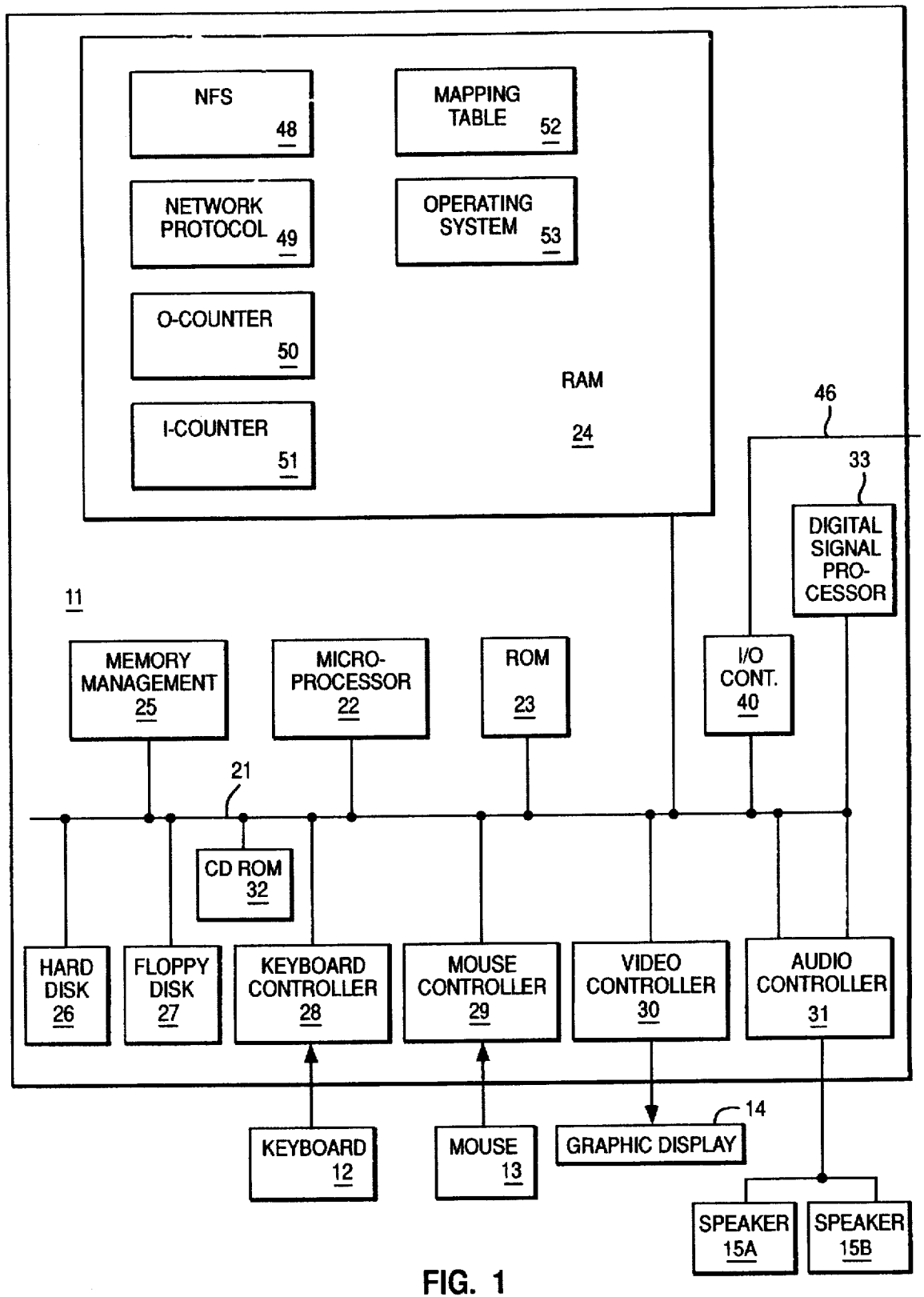
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or others Hewlett Packard, Sun, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48-53 resident in the random access memory 24 of a network of computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements. Further, the invention is often described in terms that could be associated with a human operator- No action by a human operator is desirable in any of the operations described herein which form part of the present invention; the operations are machine operations processing electrical signals to generate other electrical signals.

In its preferred embodiment, the invention is an extension to the implementation of the Network File System (NFS), an industry standard network file service, to be a fault tolerant distributed file system. NFS is described in Sun MicroSystems, Inc. NFS:Network File System: Version 2 Protocol Specification, RFC-1094, 1989.

While the design described in the specification is for NFS, the invention can be extended to other distributed file systems. Primarily, other distributed file systems must be adapted to include the counters and a way to multicast or broadcast to the plurality of servers in the replicated server group.

In addition to the synchronization, the goals of the invention include:

1. Fault transparency. Failures and recovery must be transparent to users using the file system clients. When a file system server fails, all the file system requests will be automatically forwarded to an available server replica.

2. Support of heterogeneous hardware platforms and file system. In one preferred embodiment, the system is an extension of NFS which supports heterogeneous workstations. Unlike DFS, which requires a special local file system to achieve fault tolerance, the invention can be adapted to support all local file systems that NFS supports. If the local file system is compatible with NFS, no major modifications will be necessary.

3. Minimum performance impact. The invention also avoids using any intermediate agents.

In contrast to RNFS and Deceit, the system does not require any intermediate agents to forward the file system requests. The collection of replicated NFS servers are treated as a group. Each group is assigned a multicast IP address. A client will be connected to each of the servers in the servers group through the "mount" command. Performance results indicate that the cost of high availability for "read" operation is much smaller than that of RNFS and Deceit.

The invention is easily carried out and adapted to a load balancing policy to dynamically adjust the workload of each replicated server. In load balancing, file access requests are directed to a least loaded file server.

Figure 2:
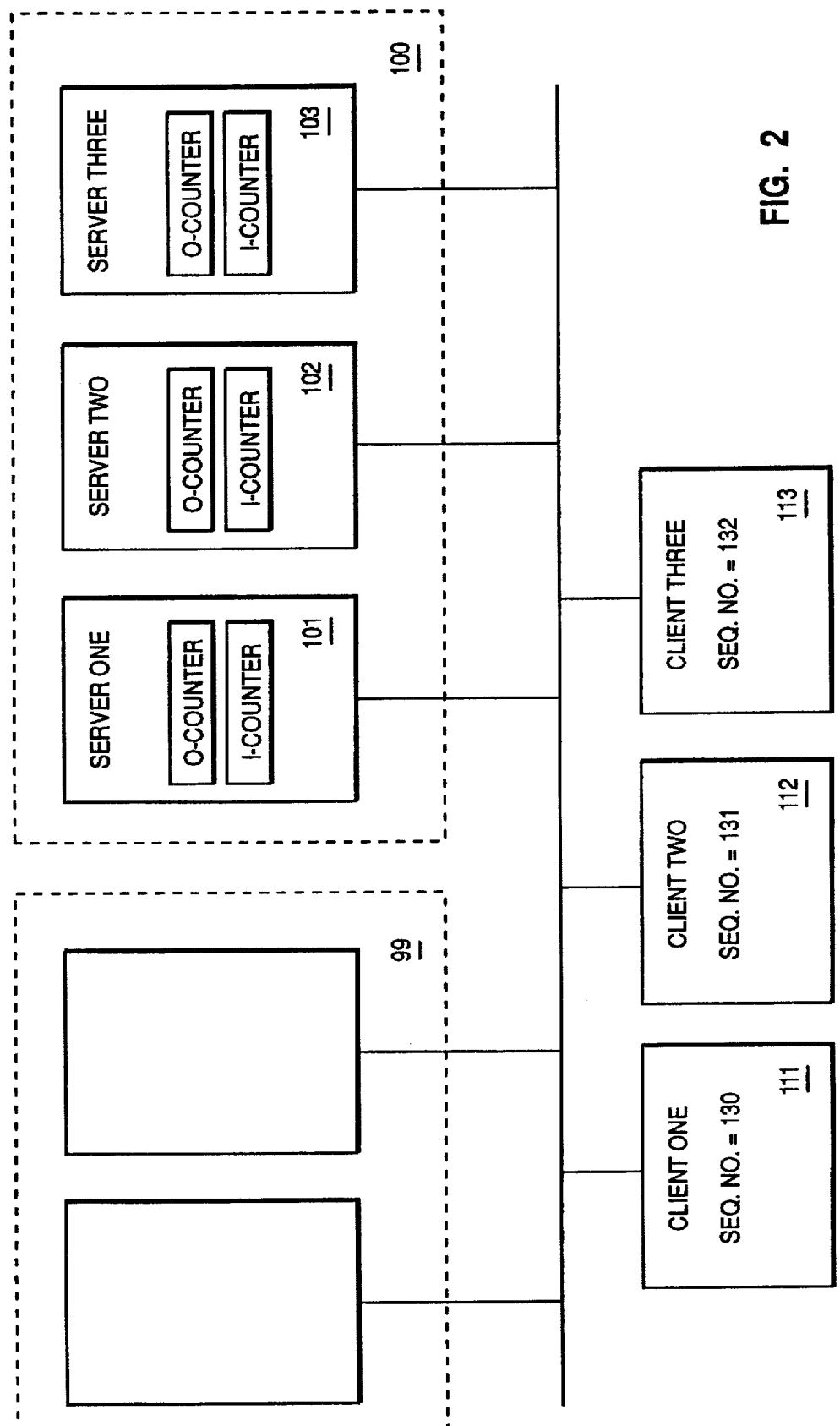
FIG. 2 depicts a distributed file system according to the invention.

In the preferred embodiment, the collection of replicated servers is treated as a group. Each group is assigned a group IP address. The group IP address will be used by the underlying multicast or broadcast protocol to deliver messages to all servers in this group. Referring to FIG. 2, two simple replicated server groups 99, 100 are depicted. In the second server group 100, servers 101, 102, 103 are coupled to the network 105. Clients 111, 112, 113 are workstations which provide user access to the replicated server groups 99, 100 and the network 105 in general in which other services and servers may be available. One skilled in the art would understand that the figure is greatly simplified for ease of illustration and explanation.

In one particular implementation, the invention runs on a plurality of IBM RISC System/6000 machines running NFS in the AIX operating system and interconnected by the Transmission Control Protocol/Internet Protocol (TCP/IP) architecture. TCP/IP uses as its link level Ethernet, a local area network (LAN) developed by Xerox Corporation. A simplified description of local area networks may be found in a book by Larry E. Jordan and Bruce Churchill entitled *Communications and Networking for the IBM PC*, published by Robert J. Brady (a Prentice-Hall Company) (1983). Although the invention is described in the above-identified context, it should be appreciated that the teachings herein may be implemented using other and different computers interconnected by other networks and other protocols other than the Ethernet LAN or TCP/IP.

Preferably, the invention is implemented in a distributed computing environment domain having any number of machines, and these machines may be located in different geographic locations. A known distributed computing environment, called DCE, has been implemented using software available from the Open Systems Foundation (OSF) in various UNIX platforms. In a distributed computing environment, a group of machines is typically referred to as a "domain". An OSF DCE domain is called a "cell." A DCE cell can be a complex environment involving hundreds of machines in disparate locations throughout the world. One reference which describes DCE is *Understanding DCE*, by Ward Rosenberry, David Kenny and Gerry Fisher, O'Reily & Associates, 1992.

While DCE is used in one preferred embodiment, DCE is not essential for the invention and most varieties of UNIX support NFS as a standard service. Further, IBM's OS/2 TCP/IP product also provides NFS support. So the invention can be applied to both OS/2, AIX or any platform which supports NFS or the selected replicated file server.

A user on the client machines uses the "mount" command to connect to the server group. The only difference between a UNIX mount and the invention's mount command is that the "host:pathname" parameter is replicated by "multicast IP address:pathname". The following is an example of the mount command:

>mount 140.117.58.7:/usr/foodir/localfoo

After the client is connected to the server group, the user can read/write files stored in the replicated servers just like normal UNIX files. In UNIX, users perform read/write operations through file handles. Each opened file is assigned a file handle. The file handle is an unique file index assigned by the server to identify an opened file. Since files are replicated in system, each replicated server will generate a file handle to the opened file. Therefores an opened file will have different file handles for servers in the replicated server group. However, the client can only recognize one file handle. To solve this problem, the client uses an "intermediate file handle" to perform any read/write operations.

The intermediate file handle is the handle that is used in the client side. To provide the mapping between the file handle used by the server and the intermediate file handle used by the client, each server maintains a table to map the intermediate file handle to the actual file handle used by the server. To the client, the replicated server group is treated as a server machine with a highly reliable disk storage. Files are replicated on all servers in the server group. The client uses the intermediate file handle to identify the object to which the operations are applied. The operation is multicasted to all servers in the server group. The multicast message contains the intermediate file handle. When a server receives this multicast request, the intermediate file handle is retrieved from the message and is translated into the actual file handle To map the intermediate handle to a particular server file handle, each server maintains a mapping table. The structure of the mapping table is described in detail in the next section.

Each replicated server maintains a mapping table to map the intermediate file handle to the real handle used by the server. An intermediate file handle contains client's IP address, a mount number and a sequence number. The mount number is used to keep track of the number of directories that the client has mounted. For example, if the client has mounted five remote directories from the replicated server group, the intermediate file handles for the files mounted under the sixth mount command will carry the mount number 6.

When a client tries to mount a directory remotely, a mount table entry is created on the server. A mount table entry contains the directory name, intermediate file handle (I_fHandle), file handle (fHandle) and other options. A mount table entry also points to a linked list of file handle mappings. Each element of the linked list contains fHandle, I_fHandle and file name. The following is the procedure for the mount command:

Step 1: Client generate an I_fHandle for the mount point.

Step 2: Client sends the mount request which carries I_fHandle to the server group.

Step 3: Each server in the server group generates a fHandle for the mount point.

Step 4: mountd of the server sends I_fHandle and fHandle to nfsd.

Step 5: nfsd creates a mount table entry and records I_fHandle and fHandle in the mapping table.

Step 6. mountd replies "ok" to the client.

Step 7. I-fHandle is handled over to NFS client.

Step 8. the client makes an RPC to the server. The server will translate the I_fHandle contained in the RPC message to fHandle with the help of the mapping table.

The intermediate file handle for each file is generated through the LOOKUP request by the client. When the server receives a LOOKUP request, it will first generate an fHandle for the target file and update the mapping table to include a new entry which contains both the intermediate file handle and the file handle. When the server receives a file access request, it first retrieved the intermediate file handle from the request message. Then the server uses the intermediate file handle to locate the real file handle through the mapping table. All read/write requests will be issued with the file handle.

According to the invention, files are fully replicated on the servers in the server group. The client can read and write files stored in any of the servers in the server group. For updates, the client will multicast its requests to the servers in the replicated server group. One of the problems is that these requests might be received and executed in different orders by the respective servers. The invention solves this problem.

In the distributed file system, the client multicasts update requests to the servers in the replicated server group. Since different server might receive these requests in different order, a "dual-counter" synchronization mechanism manages concurrent updates.

The counters can be implemented by any programing language and the local file system. One possible way to implement a counter in a program is to:

1. Set the initial value of a program variable.
2. Increment the program variable whenever an event occurs, in this case, when a request for a sequence number of update occurs.
3. Save the program variable to a file such that if system failure occurs, then the value can be retrieved in the event the system is backed up. One skilled in the art would appreciate that program variables are in memory and will be loaded into registers for manipulation. Thus, a hardware equivalent using registers could be provided.

Within each server group, a server is designated as a sequencer. If the sequencer goes down another server is designated the sequencer. The sequencer is responsible for assigning a unique sequence number for each update command received by the server group. The client, however, does not need to know the exact location of the sequencer. When a client receives a update request, it will first multicast its recklest to obtain a sequence number from the sequencer. Any server in the server group will likely receive this request. Only the sequencer responds to the client with a sequence number. The sequencer uses the "O_Counter" to keep track of the largest sequence number sent. When the client receives the sequence number, it will send its update request with the sequence number to the server group through a multicast message.

The servers which are not the sequencer receive this request will also increment their "O_Counter", but will not send back a sequence number to the client. The other sequencers have an O_Counter in the event that the sequencer goes down and they are designated as the new sequencer. Upon receiving requests for sequence numbers, those servers will start a timer T1 with timeout value Tt. Within Tt, either the client will notify the servers through multicast that the update request with the current "O_Counter" has been completed or the server will receive the update request from the client. If timer T1 expires, each server, will inquire other servers whether the update request has been received or not. Those servers who have received the request will respond with a "received" message and the Update request from the client will be included in the "received" message. The server which missed the original update request will perform the update request based on the information stored in the "received" message. If none of the servers respond with the "received" message, the server will cancel the sequence number and notify other servers in the server group. One of the possible reasons for this condition to occur is that the client crashes after obtaining the sequence number.

In addition to the O_Counter, each server also maintains an I_Counter to keep track of the largest sequence number of the update request which has been completed. When the server receives the update request, it will compare the sequence number, Mi, stored in the message and the I_Counter. If Mi is larger than the I_Counter by 1, then the server will update its local file system and increment the "I-Counter" to indicate that the update request has been serviced. If Mi is equal to or less than the I_Counter, the update request is a duplicate and is discarded. If Mi is larger than I-Counter plus 1, it means that the current update request needs to wait until at least one other concurrent update request is completed. In this case, the server will multicast a query to other servers in the server group to obtain those update requests which it has not received.

Figure 3:
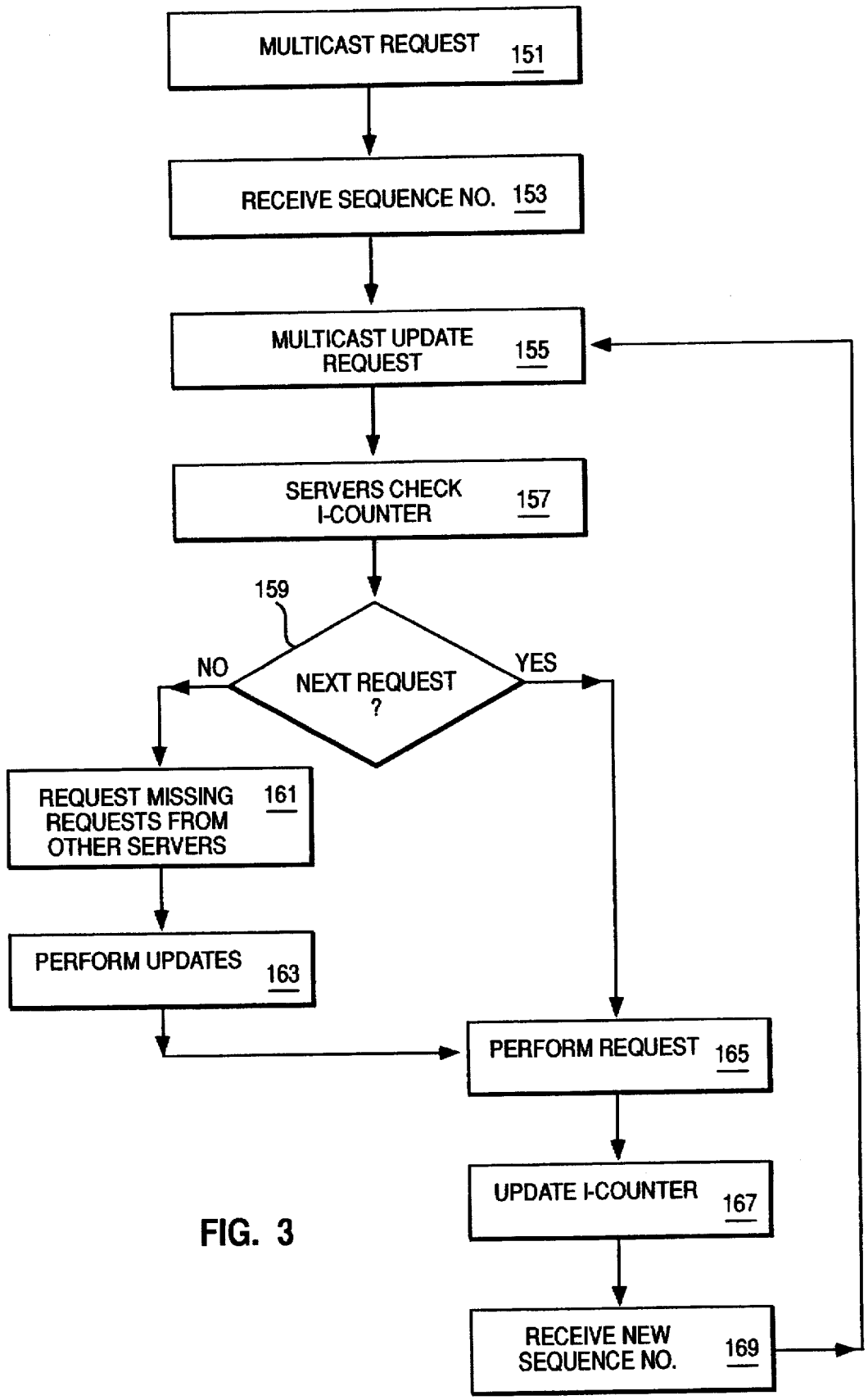
FIG. 3 is a flow diagram of the dual counter synchronization mechanism.

FIGS. 2 and 3 illustrate the basic idea of the "dual-counter" scheme. Server One, Server Two and Server Three 101, 102, 103 are servers of a replicated file server group 100 and Server Two 102 is the sequencer. Client One, Client Two and Client Three 111, 112, 113 are clients. Each client has previously multicast a request to the servers for a sequence number and received a sequence number from the sequencer, steps 151 and 153 in FIG. 3. Each time the client wishes to make an update request, it must request a sequence number. Client One has obtained a sequence number of 130 for its update request. Client Two's sequence number is 131 and Client Three's sequence number is 132. The O_Counter of Server Two is 133 indicating that the next sequence number given by the sequencer will be 133. The I-Counter values of Server One, Server Two and Server Three are all 129, indicating that none of the servers have received update requests with sequence number larger than 129. In this example, Client One 111 sends its update request with sequence number 130 first, step 151. All three servers 101–103 receive this request and check the value of their I_Counter step 157. Since the sequence number is equal to I_Counter plus 1, all three servers perform the update step 165 and update their I-Counter to 130, step 167. Next, Client Two 112 sends its update request with sequence number 101 step 155. However, only Server One 101 receives that request. Server One 101 checks the sequence number with its I-Counter and determines that this is a valid request, steps 157, 159. Server One 101 updates the file, step 165, increments its I-counter, step 167, and returns a confirmation back to Client Two 112. In the meantime, Client Three 113 sends its update request with sequence number 132. Server One 101 determines that the request is valid since the sequence number (132) is equal to its I-Counter (131) plus 1. However, Server Two 102 and Server Three 103 find that they had missed the update request with sequence number 131 because the value of their I-Counters is 130 and the sequence number in the update request is 132. Server Two and Server Three will query Server One to obtain the update request of Client Two, step 161, and perform that update, step 163 before they apply the update request from Client Three, step 165.

One process to detect when the sequencer crashes is as follows. Upon receiving a request for a new sequence number, the servers will start a timer T2 with a timeout value Tx. Within Tx, the server will expect to receive an update request from the client, notification from the client that the update request has been completed or notification that the client has crashed. If none of these events occur, the server will inquire to the sequencer whether the sequence number was sent. Upon receiving no reply from the sequencer after a certain number of attempts, the server will assume that the sequencer has crashed. In this case, the server notifies the other servers in the server group. In one preferred embodiment, the first server which concludes that the sequencer is down will automatically designate itself the new sequencer and broadcast a message to the other servers in the group. In an alternative embodiment, the servers will negotiate within the group to determine the last sequence number of which any server is aware. Those skilled in the art would appreciate that other means for detecting the sequencer crash are possible. The sequence number could be sent out to the other servers in the replicated file server as well as to the requesting client. The servers could be coupled togehter in a ring network through which a heartbeat or similar signal could be sent. Other known algorithms exist for detecting the crash of a system in a network.

In this invention, a dual-counter consistency control mechanism manages concurrent updates to replicated files in a Fault-Tolerant NFS. Within each server group, a server is designated as a sequencer. The client needs to obtain a sequence number from the sequencer for each update request. Each server maintains two counters. The O_Counter is used mainly by the sequencer to send out sequence numbers. The I-Counter is used by each server to keep track of the largest sequence number of requests which have been completed on the server.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. In a distributed computing environment, a method of managing concurrent updates by a group of server machines coupled together by a network, each server machine having a respective first and second counter, the method comprising the steps of:

in response to a client request from a client machine also coupled to the network, sending a unique sequence number identifying the client request derived from the first counter in a first server machine to the group of server machines and the client machine;

incrementing the first counter in the group of server machines;

in response to a client update request from the client machine including the unique sequence number, checking by each server machine in the group of server machines against its second counter that all other update requests with lower sequence numbers have been received;

in response to missing sequence numbers, requesting from other servers in the group of servers for update requests corresponding to the missing sequence numbers; and performing the update request if all update requests up to the unique sequence number have been received by the respective server machine.

2. A method for managing a replicated file server including a plurality of servers coupled by a network, comprising the steps of:

sending a sequence number from a counter in a first server to a client requesting a right to perform an update request, the sequence number identifying a particular update request;

sending the sequence number and the update request to the plurality of servers by the requesting client;

checking by a second server in the plurality of servers the sequence number against a counter in the second server that all updates with lower sequence numbers have been received; and performing the update request if all update requests up to the sequence number have been received by the second server.

3. The method as recited in claim 2 further comprising the steps of:

checking by a third server in the plurality of servers the sequence number against a counter in the third server that all updates with lower sequence numbers have been received;

in response to missing sequence numbers, requesting from the second server for update requests corresponding to the missing sequence numbers; and performing the update request once all update requests up to the sequence number have been received by the third server.

4. The method as recited in claim 3 wherein each of the servers in the plurality of servers has a respective first and second counter, the first counter of a type used to derive sequence numbers, the second counter of a type used to check a sequence number accompanying an update request.

5. The method as recited in claim 4 wherein a request for a sequence number is sent to the plurality of servers by the requesting client and the method further comprising the steps of:

in response to the reception of the request for a sequence number by a second server, determining whether a sequence number has been sent by the first server;

in response to an apparent failure of the first server, determining whether the first server has failed; and in response to the failure of the first server, assuming creation of sequence numbers by the second server.

6. The method as recited in claim 2 wherein the update request is multicast to each of the plurality of servers.

7. The method as recited in claim 2 wherein a plurality of clients request a right to perform update requests, a sequence number is sent to each client by the first server and each of the plurality of servers perform update requests in an order in which the sequence numbers were sent.

8. The method as recited in claim 6 further comprising the steps of:

setting a timer in response to receiving the request for the right to perform an update request;

in response to an apparent failure of the requesting client to send the sequence number and the update request to the plurality of servers within a period of time, checking whether any of the plurality of servers received the sequence number and update request; and in response to nonreception by the plurality of servers, cancelling the sequence number in the plurality of servers.

9. A computer memory for storing a set of computer readable instructions for managing a replicated file server including a plurality of servers coupled by a network, comprising:

means for requesting a sequence number from a counter in a first server by a client, the sequence number for identifying an update request to be made by the client;

means for sending the sequence number and the update request to the plurality of servers by the requesting client;

means for checking by a second server in the plurality of servers the sequence number against a counter in the second server that all update requests with lower sequence numbers have been received; and means for performing the update request if all update requests up to the sequence number have been received by the second server.

10. The memory as recited in claim 9 further comprising:

means for checking by a third server in the plurality of servers the sequence number against a counter in the third server that all updates with lower sequence numbers have been received;

means responsive to missing sequence numbers for requesting from the second server for update requests corresponding to the missing sequence numbers: and means for performing the update request once all update requests up to the sequence number have been received by the third server.

11. The memory as recited in claim 10 further comprising:

means responsive to reception of a request for a sequence number for a second server for determining whether a sequence number has been sent by the first server;

means responsive to an apparent failure of the first server for determining whether the first server has failed; and means responsive to the failure of the first server for assuming creation of sequence numbers by the second server.

12. The memory as recited in claim 11 further comprising:

means for setting a timer in response to receiving the request for a sequence number;

means responsive to an apparent failure of the requesting client to send the sequence number and the update request to the plurality of servers within a period of time, checking whether any of the plurality of servers received the sequence number and update request; and means responsive to nonreception by the plurality of servers for cancelling the sequence number in the plurality of servers.

13. A replicated file server comprising:

a network;

a plurality of file servers coupled to the network, each file server having a respective first and second counter, the first counter in a first server for generating sequence numbers which entitle requesting clients to perform update requests, the second counter in the plurality of servers for sequencing update requests from the requesting clients; and a plurality of clients coupled to the network for making update requests to the plurality of servers.

14. The replicated file server recited in claim 13 further comprising means for multicasting update requests to the plurality of servers.

15. The replicated file server recited in claim 14 further comprising:

means for multicasting requests for sequence numbers to the plurality of servers by the requesting clients;

means for multicasting a particular sequence number and a corresponding update request to the plurality of servers by the requesting client;

means for checking by each server in the plurality of servers the particular sequence number against a respective second counter that all update requests corresponding to lower sequence numbers have been received; and means for performing the update request corresponding to the particular sequence number if all update requests up to the particular sequence number have been received by the respective server.

16. The replicated file server as recited in claim 15 further comprising:

means responsive to missing sequence numbers for requesting for update requests corresponding to the missing sequence numbers: and means for performing all update requests corresponding to the missing sequence numbers.

17. The replicated file server as recited in claim 13 further comprising:

means responsive to reception of a request for a sequence number for a second server for determining whether a sequence number has been sent by the first server;

means responsive to an apparent failure of the first server for determining whether the first server has failed; and means responsive to the failure of the first server for assuming creation of sequence numbers by the second server.

18. The replicated file server as recited in claim 13 further comprising:

means for setting a timer in response to receiving the request for a sequence number;

means responsive to an apparent failure of a requesting client to send the sequence number and the update request to the plurality of servers within a period of time, checking whether any of the plurality of servers received the sequence number and update request; and means responsive to nonreception by the plurality of servers for cancelling the sequence number in the plurality of servers.

* * * * *